United States Patent [19]

Malott

[11] Patent Number: 5,732,756
[45] Date of Patent: Mar. 31, 1998

[54] RETRACTABLE AWNING WITH IMPROVED ASSEMBLY FEATURES

[75] Inventor: Dale G. Malott, Middlebury, Ind.

[73] Assignee: The Dometic Corporation, LaGrange, Ind.

[21] Appl. No.: 408,212

[22] Filed: Mar. 22, 1995

[51] Int. Cl.⁶ .................................................. E04F 10/06
[52] U.S. Cl. ................................................. 160/67; 160/302
[58] Field of Search ............................. 160/67, 292, 300, 160/301, 302, 305, 315

[56] References Cited

U.S. PATENT DOCUMENTS

| | | | |
|---|---|---|---|
| 705,594 | 7/1902 | Mathers | 160/300 |
| 1,777,778 | 10/1930 | Zecher. | |
| 2,812,809 | 11/1957 | Nicholas | 160/301 X |
| 3,274,676 | 9/1966 | Gallagher et al. | 160/351 X |
| 3,450,424 | 6/1969 | Calisher. | |
| 3,918,511 | 11/1975 | Upton, Jr. | |
| 3,949,960 | 4/1976 | McKee. | |
| 3,980,121 | 9/1976 | McKee. | |
| 4,077,419 | 3/1978 | Lux. | |
| 4,112,996 | 9/1978 | Föhl. | |
| 4,117,876 | 10/1978 | Bennett. | |
| 4,171,013 | 10/1979 | Clark. | |
| 4,346,749 | 8/1982 | Singletary et al. | 160/301 |
| 4,524,791 | 6/1985 | Greer. | |
| 4,607,654 | 8/1986 | Duda. | |
| 4,673,017 | 6/1987 | Lauzier. | |
| 4,719,954 | 1/1988 | Curtis et al.. | |
| 4,733,683 | 3/1988 | Pozzi. | |
| 4,759,396 | 7/1988 | Quinn. | |
| 4,770,223 | 9/1988 | Ouellette. | |
| 5,002,111 | 3/1991 | Boiteau. | |
| 5,078,198 | 1/1992 | Tedeschi | 160/301 X |
| 5,351,736 | 10/1994 | Laffler et al.. | |

FOREIGN PATENT DOCUMENTS

| | | |
|---|---|---|
| 182619 | 3/1907 | Germany. |
| 10728 | of 1899 | United Kingdom. |
| 6413 | of 1899 | United Kingdom. |

*Primary Examiner*—Blair Johnson
*Attorney, Agent, or Firm*—Pearne, Gordon, McCoy & Granger LLP

[57] ABSTRACT

A retractable awning is provided with a multiple position pivot support adapted for mounting the awning in different installations. A flange of a mounting bracket fits in one of several slots in the support according to a wall and awning rail structure. A roller is provided with a notch into which is wedged a rope in a hem pocket of the awning. The notch retains the rope and holds the awning taut. Rafter arms a pivotably attached to slides held in slideways on external faces of support arms. A stop and latch mechanism hold the rafter in an extended position so that pivoting of the support arms does not change tension of the awning. An improved roller lock uses a pair of pawls engaging a gear. A spring biases the lock to either of two engaged positions.

10 Claims, 16 Drawing Sheets

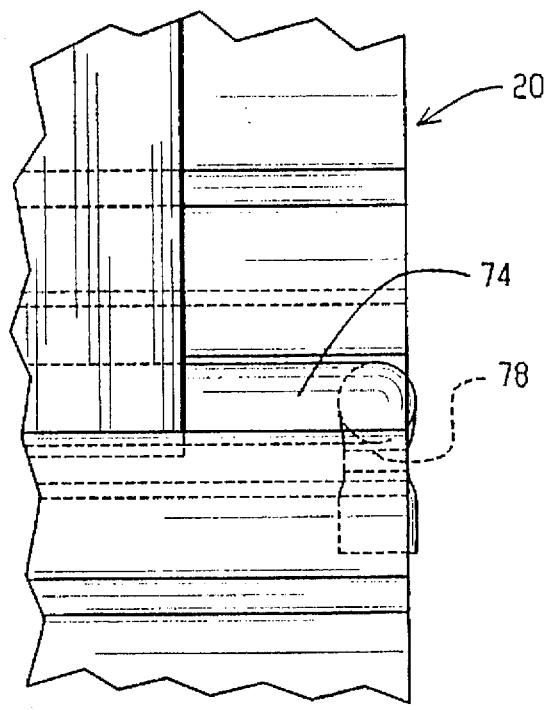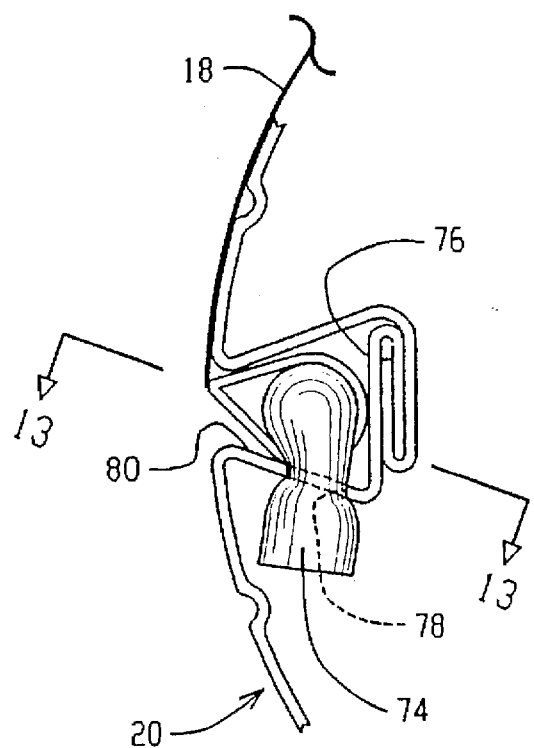
FIG. 11
FIG. 12
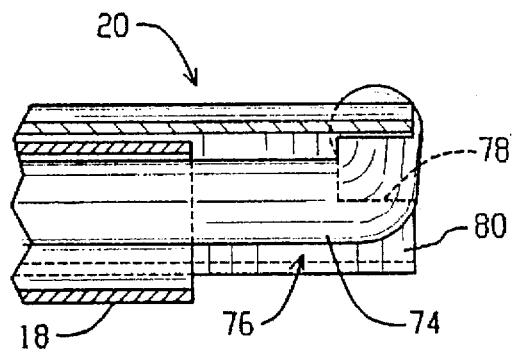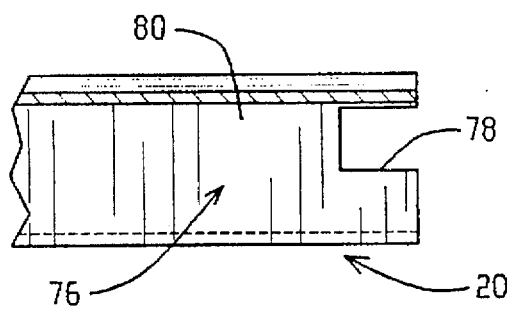
FIG. 13
FIG. 14

RETRACTABLE AWNING WITH IMPROVED ASSEMBLY FEATURES

BACKGROUND OF THE INVENTION

1. Field of the Invention

This invention relates generally to the field of awnings and specifically to a vehicle awning with components facilitating improved assembly and operation.

2. Description of the Related Art

There are a number of known retractable assemblies that support an awning to create a sheltered area. The awning is usually supported in a generally horizontal position with a slight slope to facilitate runoff of rainwater. Commonly, one edge of the awning is attached to a wall. The opposite edge is attached to a tube, rod, rail or other similar elongated member, which is supported by two support arms. The support arms rest on the ground or are mounted to a lower part of the wall. Tension rafter arms are disposed between the wall and the tube or rail to stretch the awning and hold it in position. In this way, a convenient shelter is formed adjacent the wall to protect people and objects beneath the wall from rain and direct sun.

Shifting roll type awnings have a roller tube suspended between the support arms. The tube is moved laterally to unroll or roll the awning on the tube. One edge of the awning is rigidly attached to the wall. It is less common, but still possible, for this type of awning to be enclosed in a case in its retracted position. U.S. Pat. No. 4,658,877 to Quinn shows an example of such an awning assembly. In both types the roller tube may be spring balanced or spring biased to aid rolling.

Retractable awnings can be divided into two general classes. Box type awnings have a stationary roller tube mounted to the wall. The awning is rolled around the tube for storage. The box comprises a stationary enclosure for the awning, a cover of which is opened to permit access to the awning which is unrolled to an extended position. Alternatively, a movable cover is attached to the free end of the awning to complete the enclosure when the awning is retracted.

A popular application for such awnings is on recreational vehicles. The awning creates a convenient outdoor shelter next to the vehicle. Simple and fast assembly and disassembly of the awning are important, especially in vehicle applications. Vehicle awnings also must be rugged and durable because they are constantly exposed to the elements.

Different hardware and assemblies are used to construct and mount the awning assemblies. The need exists for improvements in the hardware and assemblies to facilitate mounting, assembly, and erection of the awning and to improve the operation of the awning.

SUMMARY OF THE INVENTION

The present invention provides improved features for awning assemblies including a roller for an awning having a bead along an edge of the awning. The roller is an elongated member having a longitudinal channel adapted for receiving and retaining the bead therein. A notch is disposed at an end of the channel, said notch being adapted for receiving an end of the bead therein in a compressed state, frictionally retaining the end of the bead, and preventing substantial longitudinal movement thereof.

An awning assembly according to the invention includes an awning having a leading edge and a trailing edge, said trailing edge being attachable at a wall. A support arm is adapted for supporting the leading edge of the awning and has an upper end spaced from the wall in a retracted position of the awning. A rafter is disposable between the support arm and the wall. A pivot support having an end of the rafter pivotably attached thereto is mounted at the wall and spacing the rafter from the wall substantially the same distance as support arm is spaced from the wall. A mounting bracket has a flange and is adapted for securing the pivot support to the wall. The pivot support includes a plurality of slots adapted for receiving the flange of the mounting bracket, each of said slots being adapted for positioning the mounting bracket differently depending on a desired mounting configuration. An awning rail is used for attaching the trailing edge of the awning at the wall. The pivot support includes a locating tab adapted for positioning the pivot support relative to the awning rail.

Another construction of the awning assembly includes an awning having a leading edge and a trailing edge, said trailing edge being attachable at a wall. A support arm is adapted for supporting the leading edge at a support axis of the awning and having a slide channel on an external face thereof. A rafter is disposable between the support arm and the wall. A slider is pivotably attached to the rafter at a pivot axis and adapted for sliding in the slide channel. A stop is adapted for positioning the pivot axis collinearly with the support axis in an extended position of the awning.

The invention also comprehends a lock assembly for an awning roller. A roller adapted for having an awning rolled thereon has an end cap mounted on an end of the roller. A rod defines a longitudinal axis of rotation of the roller. A stop is rigidly mounted to the rod. A lock has a pawl adapted for engaging the stop so as to prevent relative rotation of the roller and rod in at least one direction. Spring means is provided for biasing the lock toward engagement with the stop.

The description of the invention refers to a shifting roll type awing assembly. However, the features and components can be adapted to other types of awnings, as well.

BRIEF DESCRIPTION OF THE DRAWINGS

FIG. 11 is a partial front view showing an end of the roller tube shown in FIG. 10;

FIG. 12 is a partial end view of the roller tube shown in FIG. 10;

FIG. 13 shows a section of the roller tube and awning taken from line 13—13 of FIG. 12;

FIG. 14 shows the view of FIG. 13 with the awning omitted;

DESCRIPTION OF THE PREFERRED EMBODIMENTS

Figure 1:
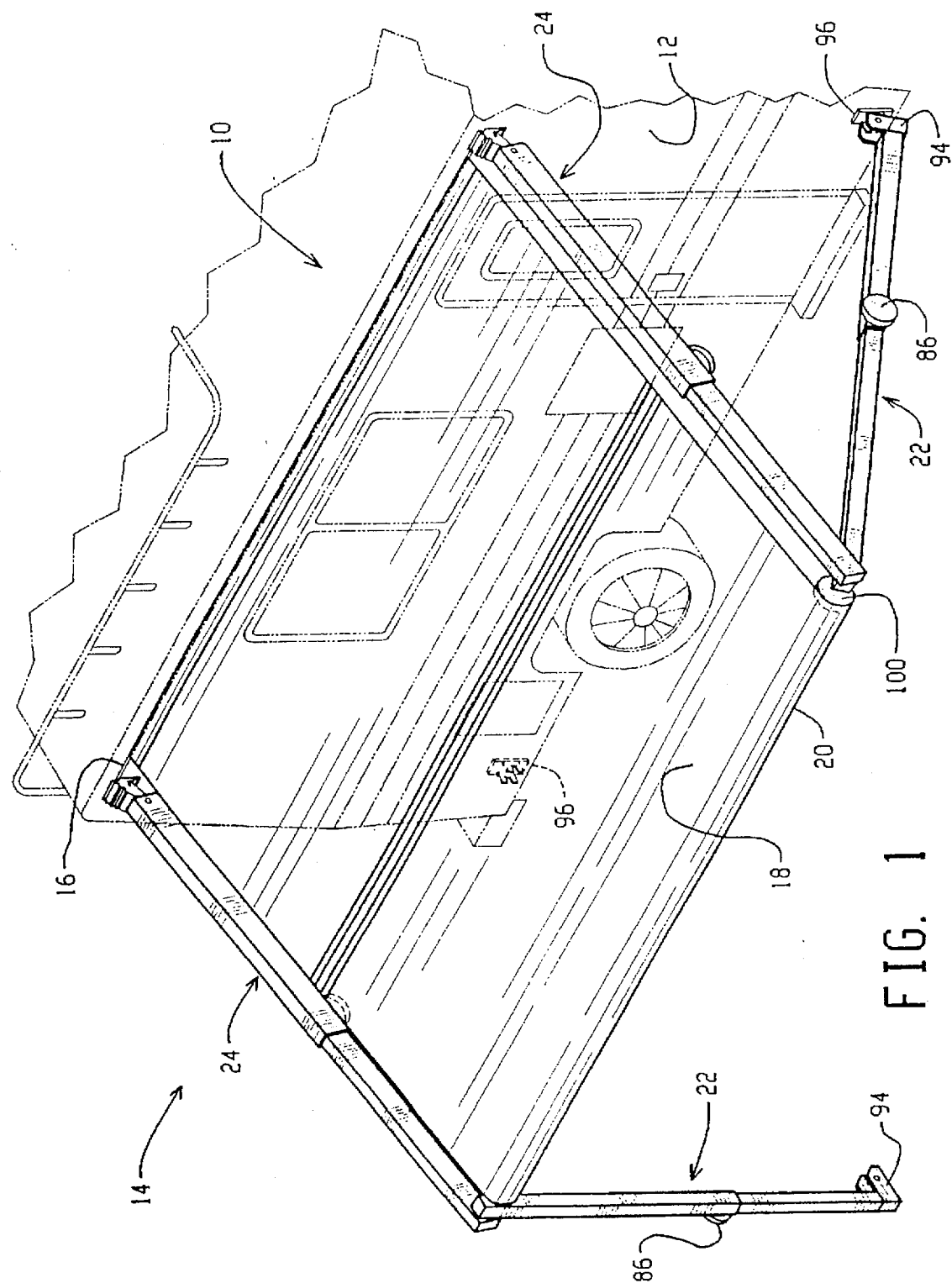
FIG. 1 is a perspective view of a vehicle having an awning assembly according to the invention mounted thereon.

Referring to FIG. 1, a vehicle 10 has a generally vertical wall 12 with an awning assembly 14 mounted thereon. Generally, the awning assembly 14 includes an awning rail 16 mounted on the wall 12 and an awning 18 rollable on a roller 20 such as a roller tube. A leading edge of the awning 18 is supported by respective support arms 22. The support arms are preferably secured to ends of the roller 20 and are removably mounted on the wall 12 or rested on a ground surface. Rafter arms 24 are disposed between leading and trailing edges of the awning 18 to maintain the awning in tension.

Figure 2:
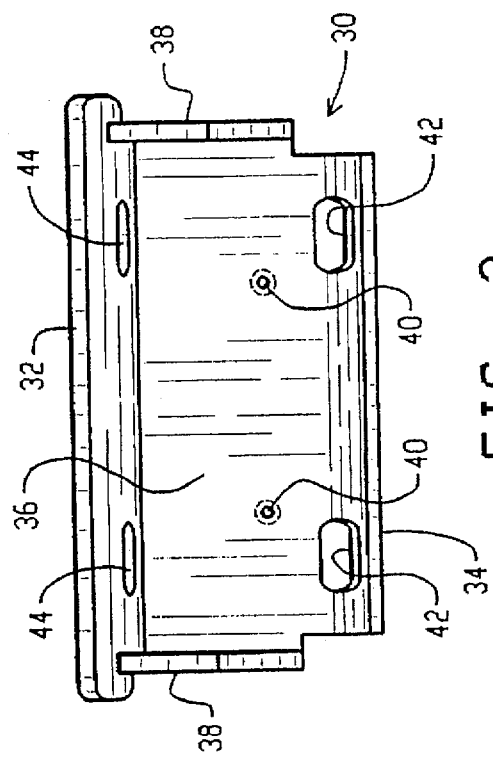
FIG. 2 is a top view of a mounting bracket according to the invention.
Figure 3:
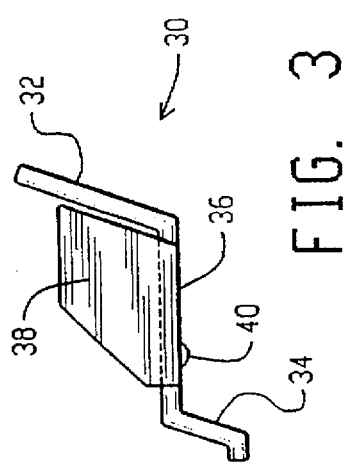
FIG. 3 is an end view of the mounting bracket of FIG. 2.

Referring to FIGS. 2 and 3, a mounting bracket 30 is preferably made of corrosion resistant steel or other durable, rigid material. The bracket 30 has a mounting flange 32 and a support flange 34 disposed at opposite ends of a body 36 of the bracket 30. Reinforcing flanges 38 are provided at ends of the body 36. Downwardly projecting dimples 40 are provided on the body 36. First and second pairs of oval mounting holes 42, 44 are located through the bracket 30 at or near the respective flanges 34, 32.

Figure 4:
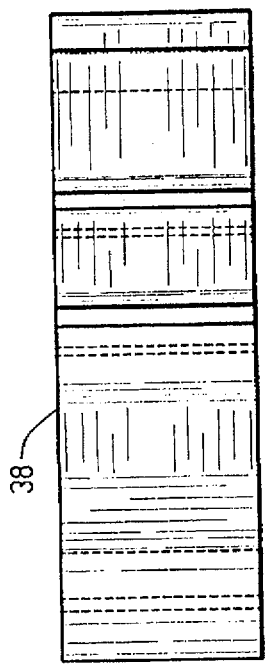
FIG. 4 is a top view of a pivot support according to the invention.
Figure 5:
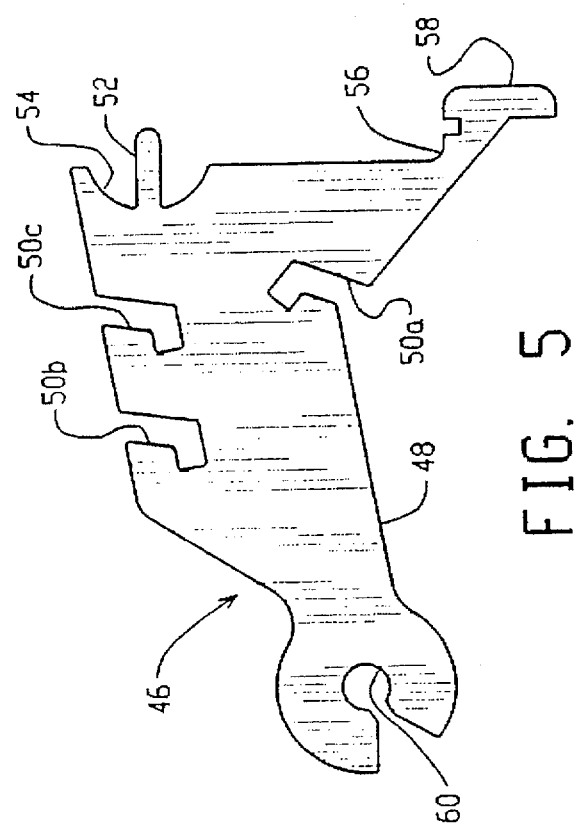
FIG. 5 is a side view of the support of FIG. 4.

Referring to FIGS. 4 and 5, a pivot support 46 is made with aluminum or other durable, rigid material. The pivot support 46 has a body 48 with first, second, and third slots 50a, 50b, and 50c located on upper and lower faces thereof. The slots 50 are adapted to receive the support flange 34 of the mounting bracket 30. A positioning tab 52 projects from a recess 54 on an inboard face of the body 48. A brace arm 56 having a foot 58 extends from below the positioning tab 52. A generally cylindrical pivot slot 60 is located at an outboard end of the pivot support 46.

Figure 6:
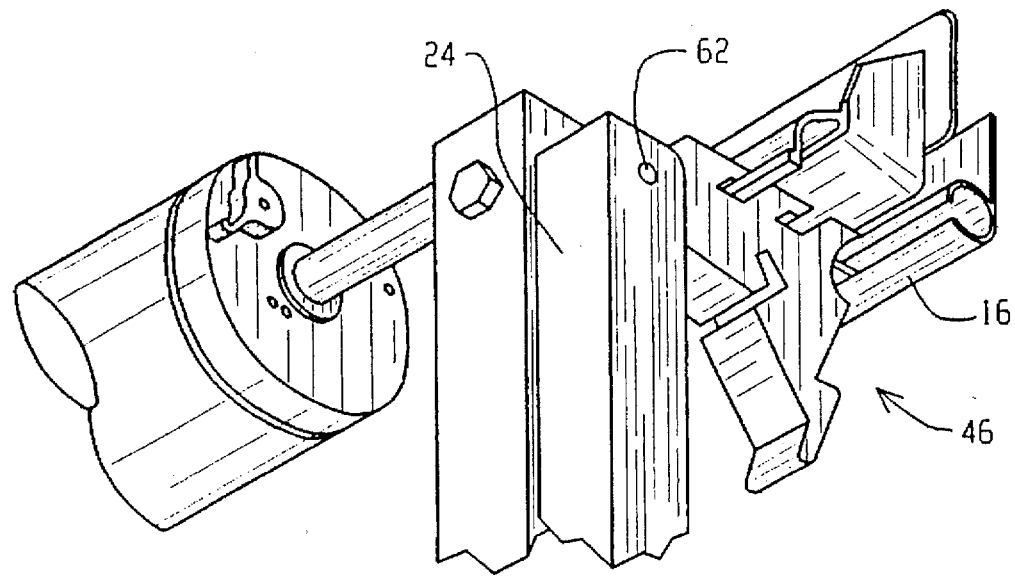
FIG. 6 is a perspective view of an end of the awning assembly showing the manner of mounting to the vehicle.
Figure 7:
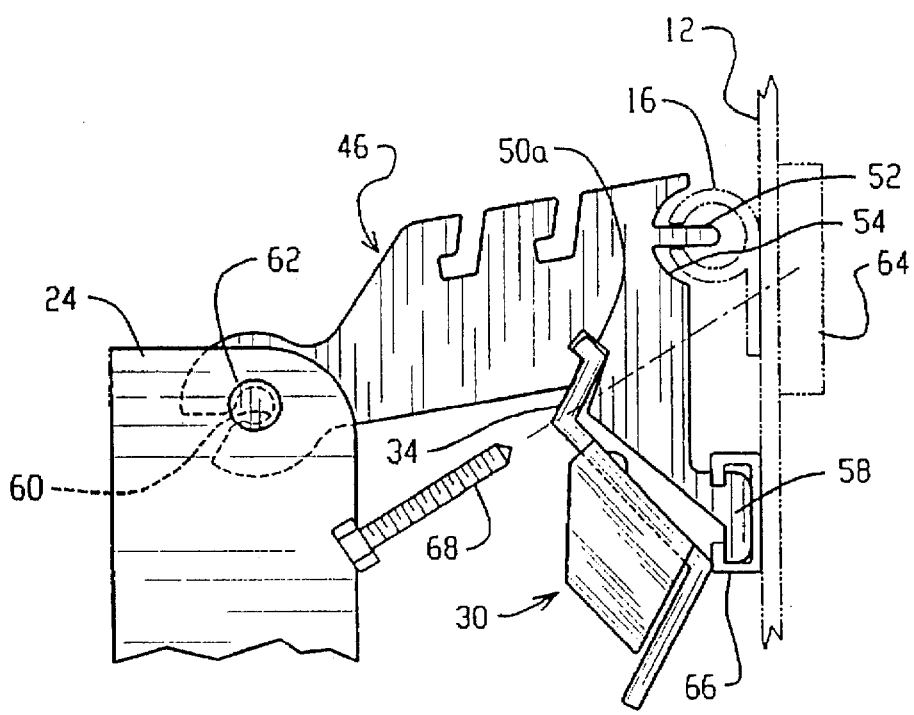
FIG. 7 is an end view of the mounting components of FIG. 6.

Referring to FIGS. 6 and 7, the rafter arm 24 is mounted to the pivot support 46 by a pivot pin 62 extending through the pivot slot 60. The awning rail 16 is mounted to a frame or brace 64 of the vehicle wall 12 in a conventional manner. The awning rail 16 defines a C-channel adapted for mounting awning components.

Referring to FIG. 7, the positioning tab 52 projects into the C-channel of the awning rail 16. The recess 54 receives the awning rail 16 therein. A plastic pad 66 is provided over the foot 58 to prevent marring of the wall 12. The foot 66 preferably rests against the wall 12. The support flange 34 of the mounting bracket 30 is located in the first slot 50a of the pivot support 46. The pivot support 46 and bracket 30 are held in place by a pair of lag screws 68 extending through the holes 42 and the wall 12 into the brace 64.

Figure 8:
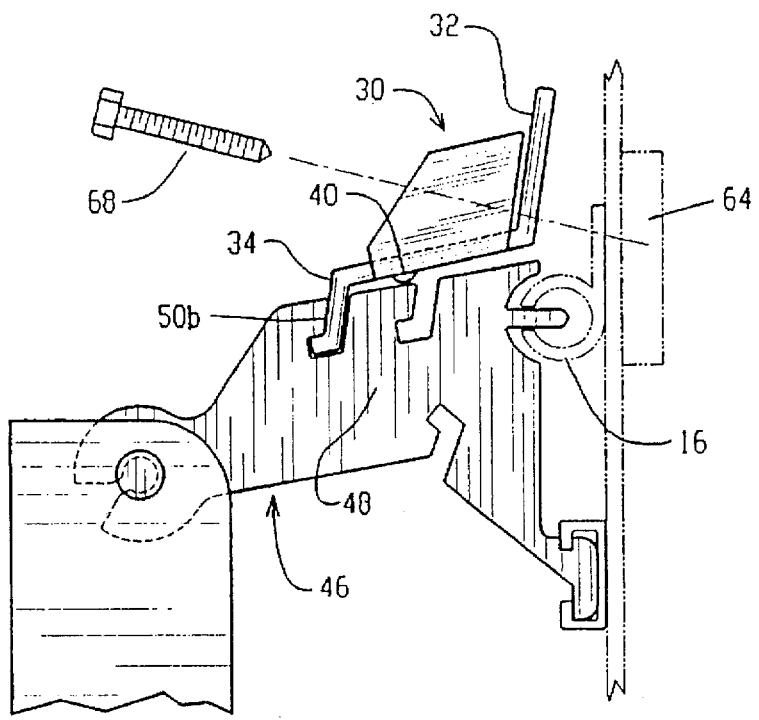
FIG. 8 is an end view of the mounting components of FIG. 6 according to another embodiment.

Referring to FIG. 8, for a different orientation of the awning rail 16, the mounting bracket 30 is located above the pivot support 46 with the support flange 34 inserted in the second slot 50b. The screws 68 extend through the mounting holes 44 into the brace 64 above the rail 16. The dimple 40 rests beside the body 48 of the pivot support.

Figure 9:
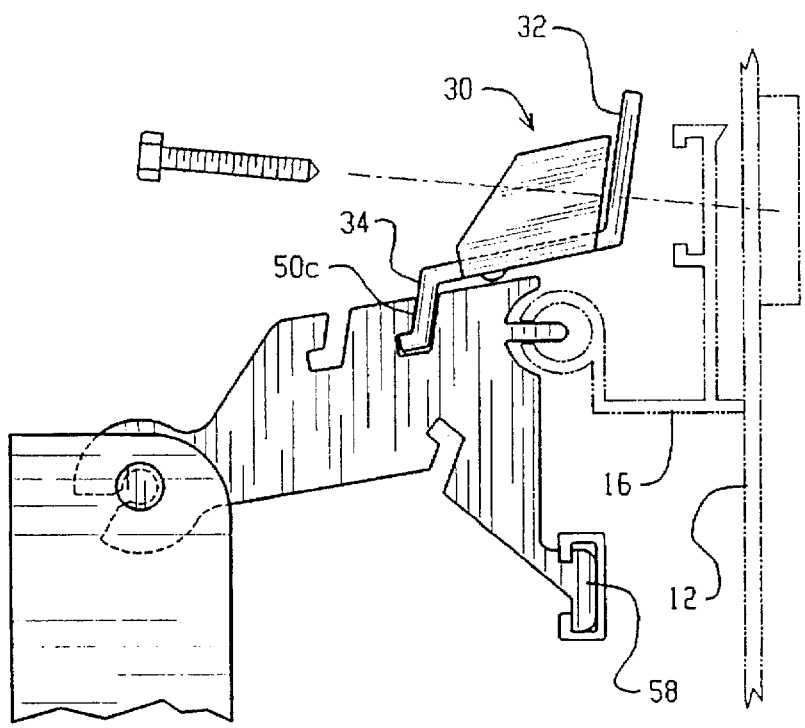
FIG. 9 is an end view of the mounting components of FIG. 6 according to a third embodiment.

Referring to FIG. 9, for a differently constructed awning rail 16 having the C-channel spaced from the wall 12, the support flange 34 is inserted in the third slot 50c. The foot 58 is spaced from the wall or can be braced against a spacer (not shown).

The pivot support 46 and mounting bracket 30 are adapted for use with different configurations of awning rails 16 and advantageously space the pivot of the rafter arm 24 from the wall, as described below.

Figure 10:
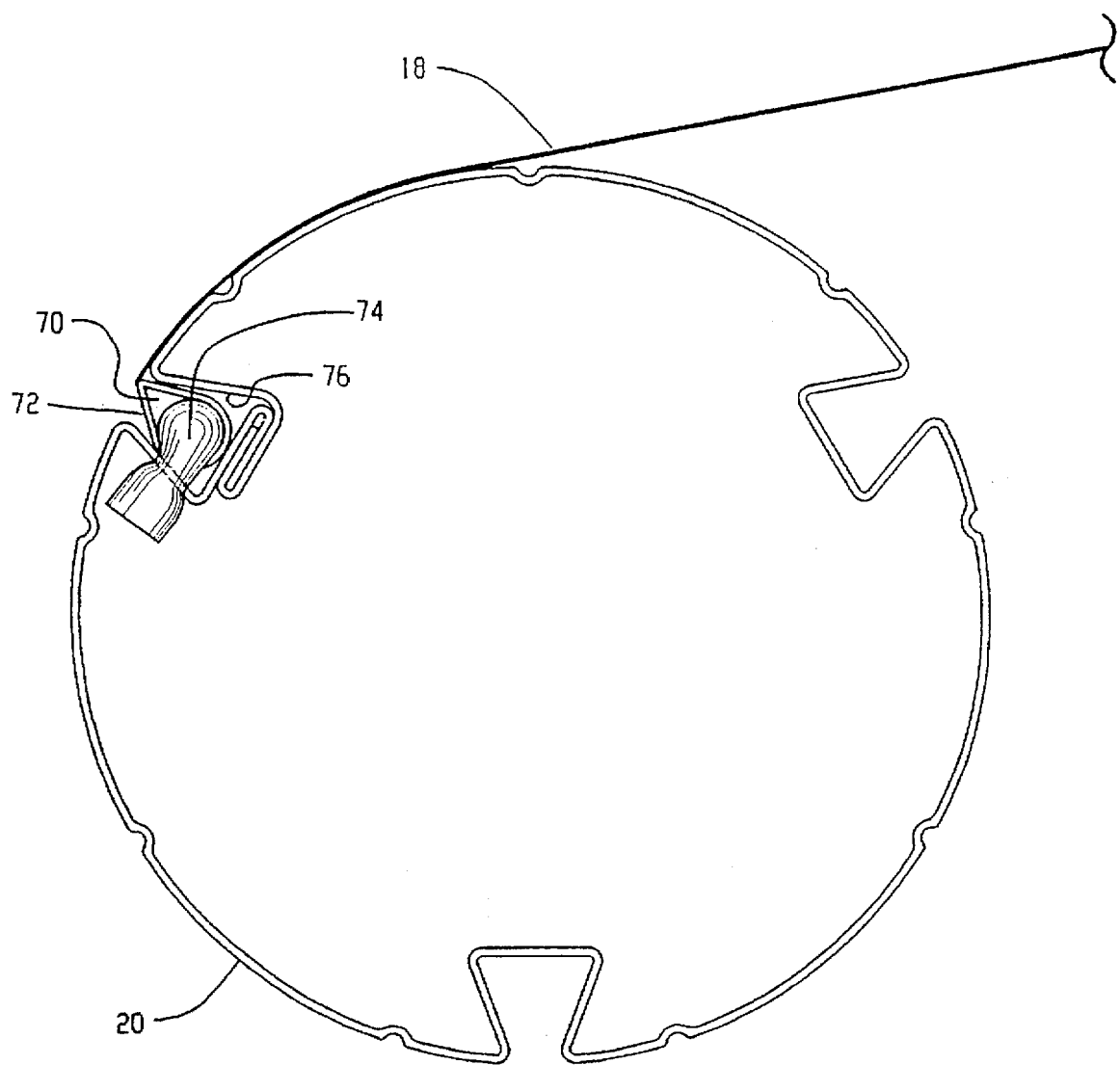
FIG. 10 is an end view of a roller tube having an awning attached thereto.

Referring to FIG. 10, the roller 20 is a roll-formed, steel tube, as described, for example, in U.S. Pat. No. 5,351,736. An edge of the awning 18 (the leading edge in the example shown) has a pocket 70 defined by a hem 72. A flexible, compressible, cylindrical rope 74, preferably made of polypropylene, is located in the pocket 70 and extends slightly beyond both ends of the pocket 70. The rope 74 and pocket 72 define a bead disposed in a slideway 76 of the roller 20. The diameter of the rope and the dimensions of the slideway are such that the rope retains the edge of the awning in the slideway.

Referring to FIGS. 11 through 14, a notch 78 is provided in a side wall 80 of the slideway 76. Alternatively, the notch 78 can be provided in a base wall or a corner of the slideway 76, for example. The notch 78 is slightly narrower than the diameter of the rope. The end of the rope 74 is compressed and wedged into the notch 78 and retained therein by friction to prevent longitudinal movement of the rope. Preferably, complementary notches are provided at opposite ends of the roller 20 so that the edge of the awning can be pulled taut and opposite ends of the rope 74 wedged into the respective notches 78 to hold the awning taut in the slideway 76.

Figure 15:
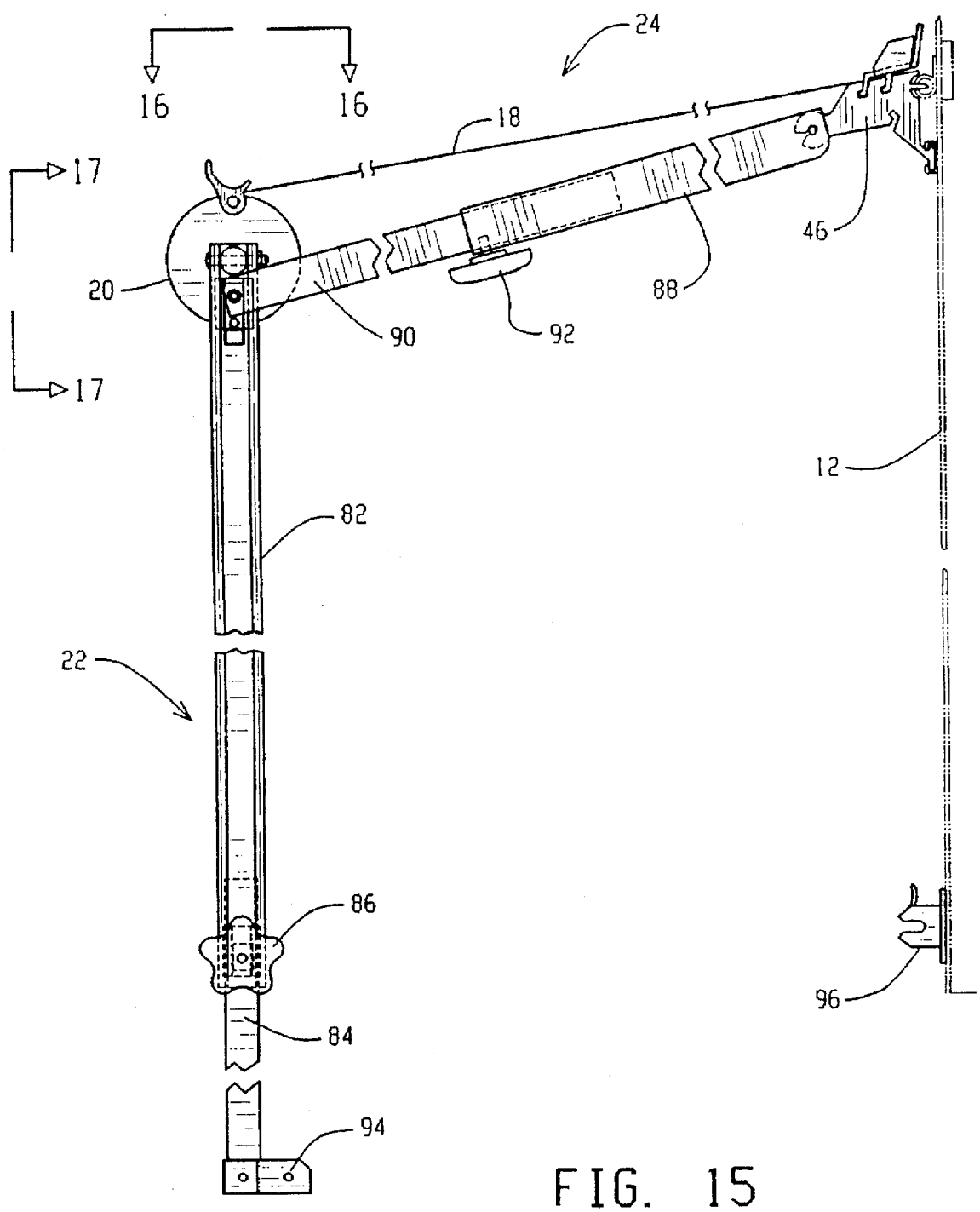
FIG. 15 is an end view of the awning assembly in a partially assembled, partially retracted position.

Referring to FIG. 15, each of the support arms 22 includes an upper arm 82 and a lower arm 84 slidingly received therein. The arms 82, 84 are frictionally locked relative to each other by a screw and knob assembly 86. Each of the rafter arms 24 includes an inboard arm 88 and an outboard arm 90 slidingly received therein. The arms 88, 90 are frictionally locked relative to each other by a screw and knob assembly 92. As previously described, the inboard end of the rafter arm 24 is pivotably mounted at the wall 12 on the pivot support 46. The lower end of the support arm 22 has a foot 94 removably and pivotably mountable at the wall in a foot bracket 96. The outboard arm 90 is slidingly and pivotably mounted to the upper arm 82, as described in more detail below. The roller 20 is rotatably mounted near the top of the support arm 22.

Figure 16:
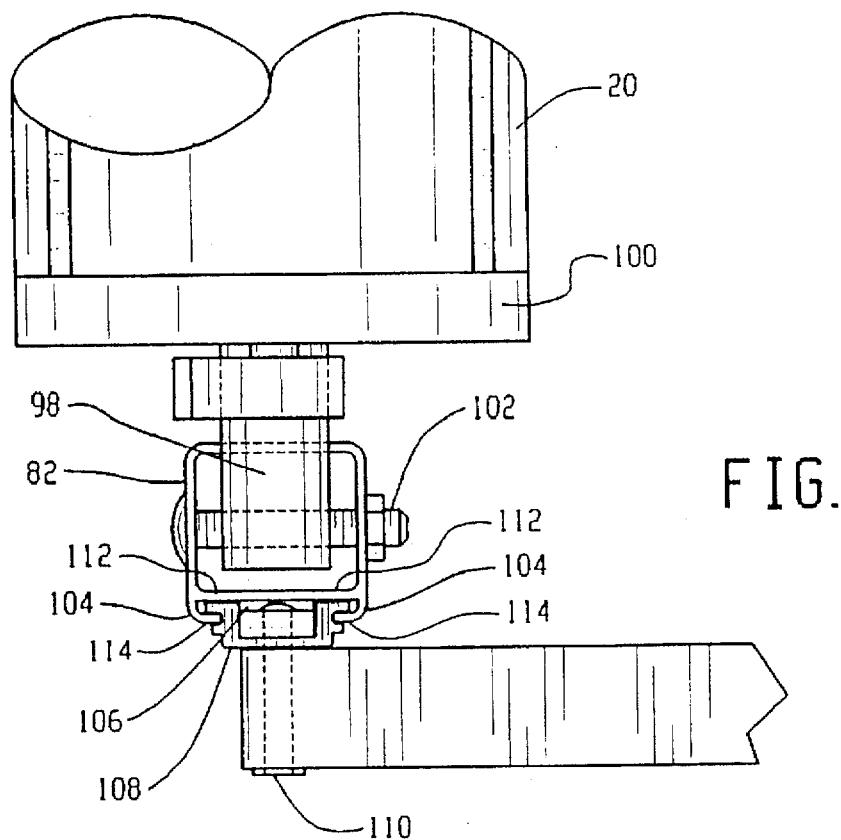
FIG. 16 is a top view of an end of the awning assembly showing the roller tube, a support arm, and a rafter arm according to the invention taken from line 16—16 in FIG. 15.
Figure 17:
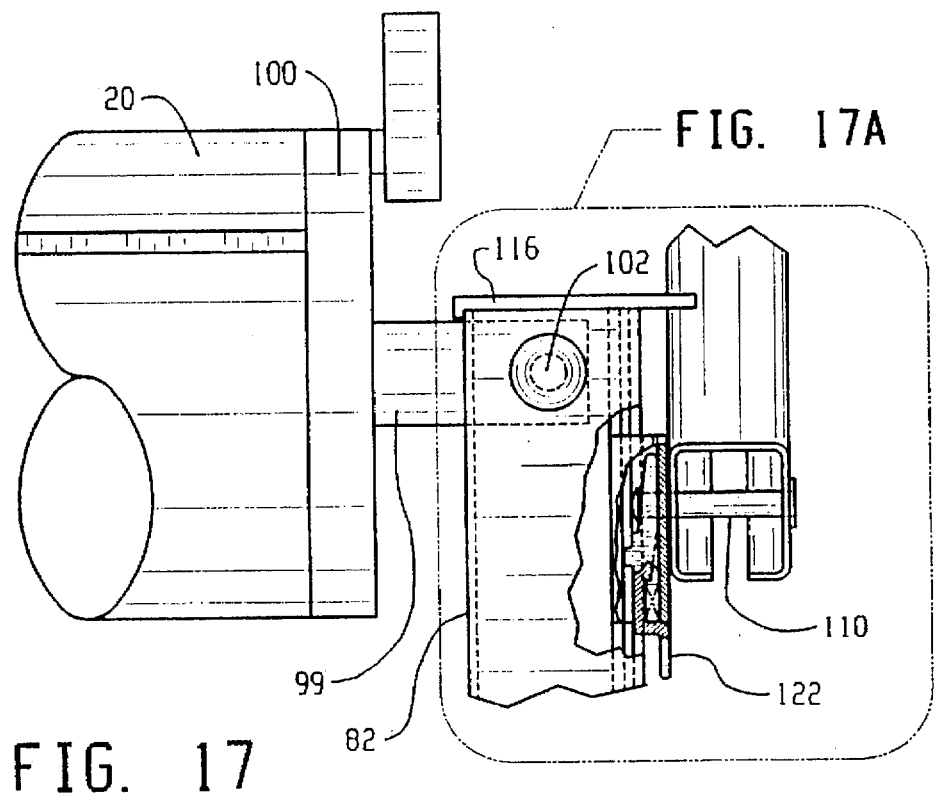
FIG. 17 is a front view of the end of the awning assembly taken from line 17—17 in FIG. 15.

Referring to FIGS. 16 and 17, the roller 20 is rotatably supported on a torsion rod 98, which can be solid or hollow. The torsion rod 98 extends longitudinally through the center of the roller 20 and through end caps 100 disposed at ends of the roller. The torsion rod 98 defines collinear support and rotational axes of the roller 20. Ends of the torsion rod 98 are supported on the upper arm 82 and secured by a nut and bolt assembly 102.

Figure 18:
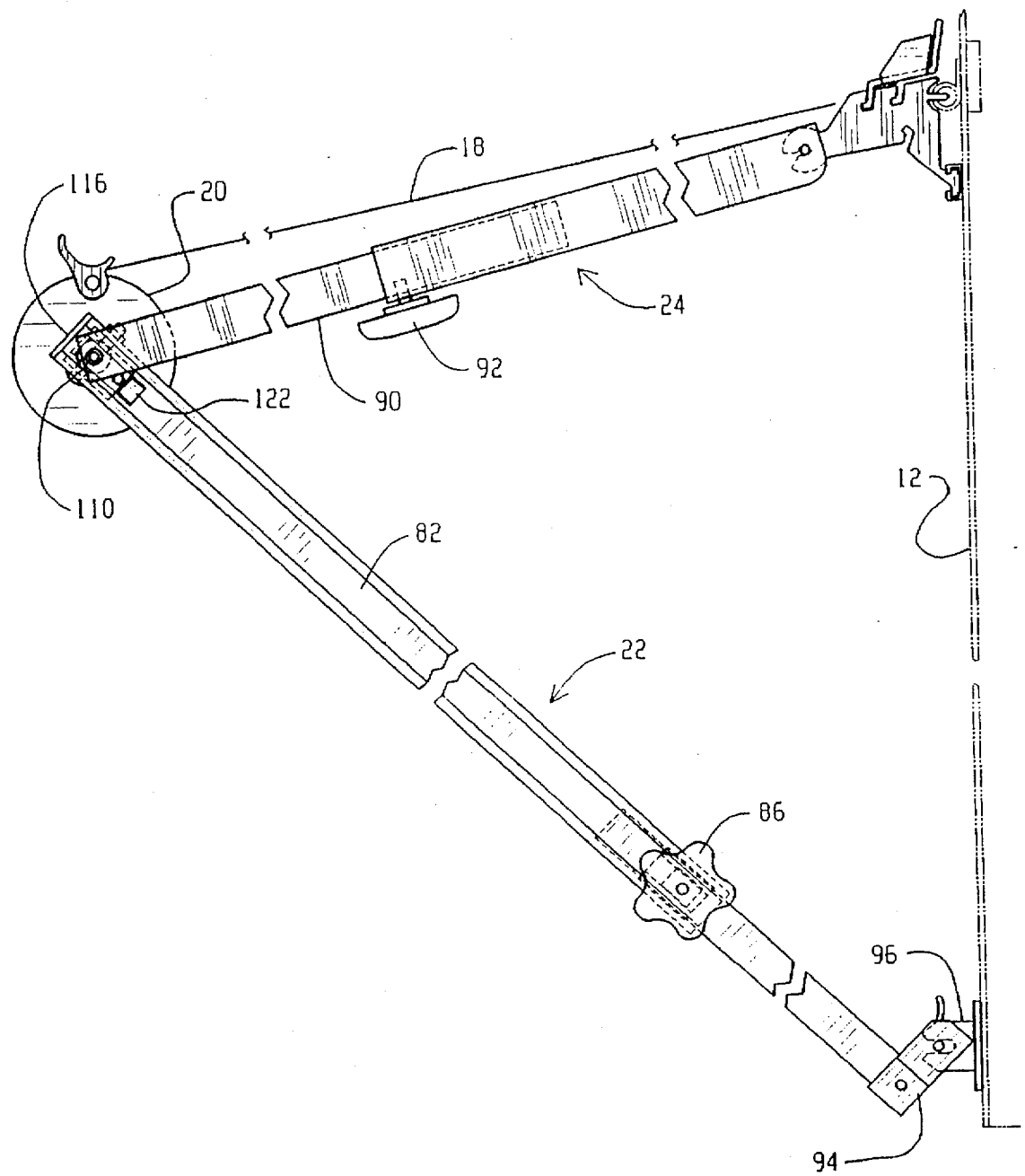
FIG. 18 is an end view of the awning assembly in a fully extended position.

An outside face of each upper arm 82 is provided with a pair of arm flanges 104 defining a longitudinal slide channel 106. A slider 108 is pivotably mounted to the outboard arm 90 on a post 110, such as a rivet. The slider 108 is made of a durable, low friction material, such as plastic. The slider has pairs of inner flanges 112 and outer flanges 114 cooperating with the arm flanges 104 to retain the slider in the slide channel 106 and permit longitudinal sliding therein. A support arm cap 116 is disposed on the top end of the upper arm 82 to limit upward travel of the slider 108. Alternatively, another blocking member, such as a screw, can be used to limit upward travel of the slider 108. As shown in FIG. 18, when the slider 108 abuts the cap 116, the post 110 defines a pivot axis substantially collinear with the torsion rod 98 and support axis of the roller 20.

Figure 17A:
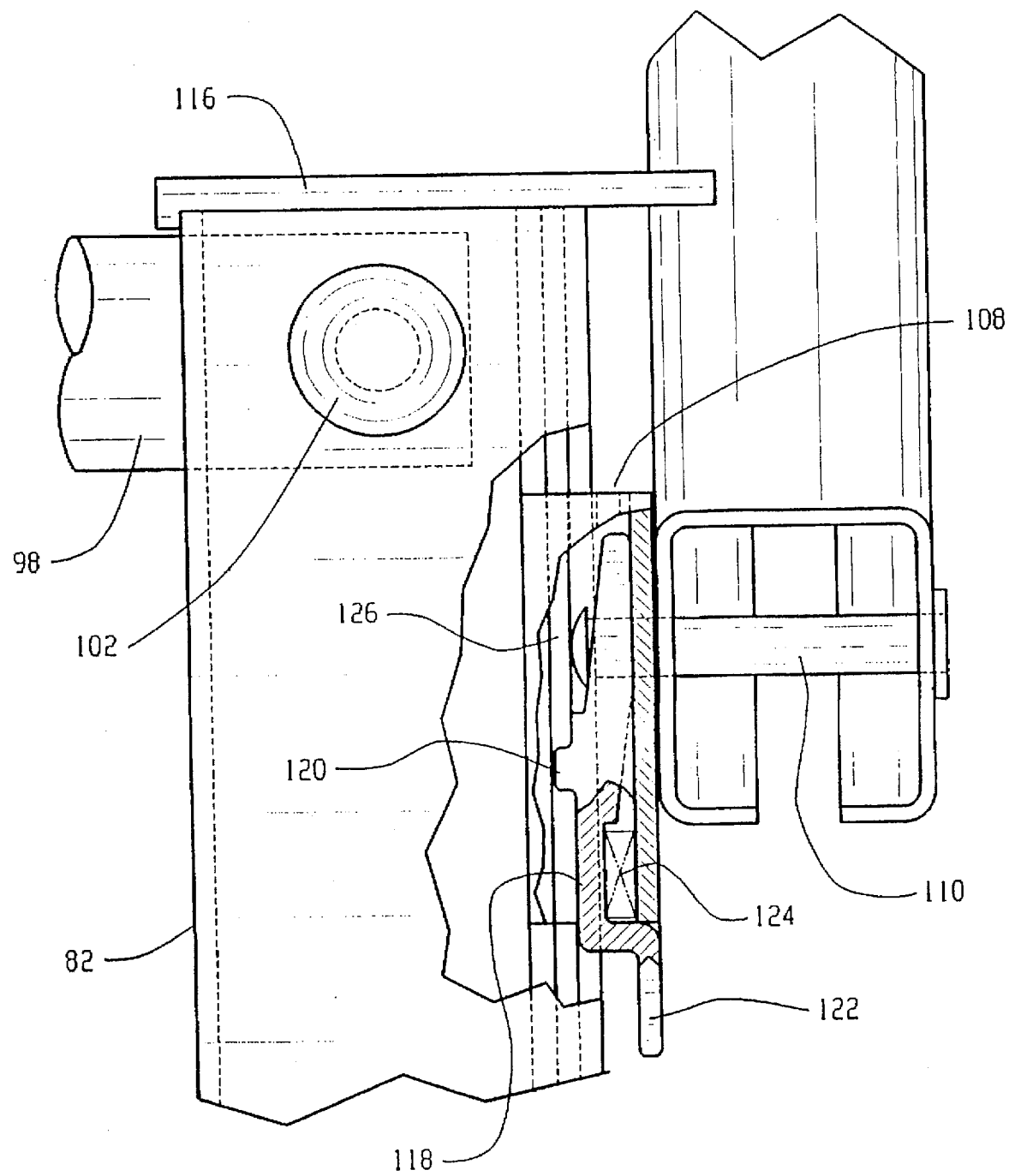
FIG. 17A is an exploded view of the rafter arm, support arm, and a slider assembly.
Figure 19:
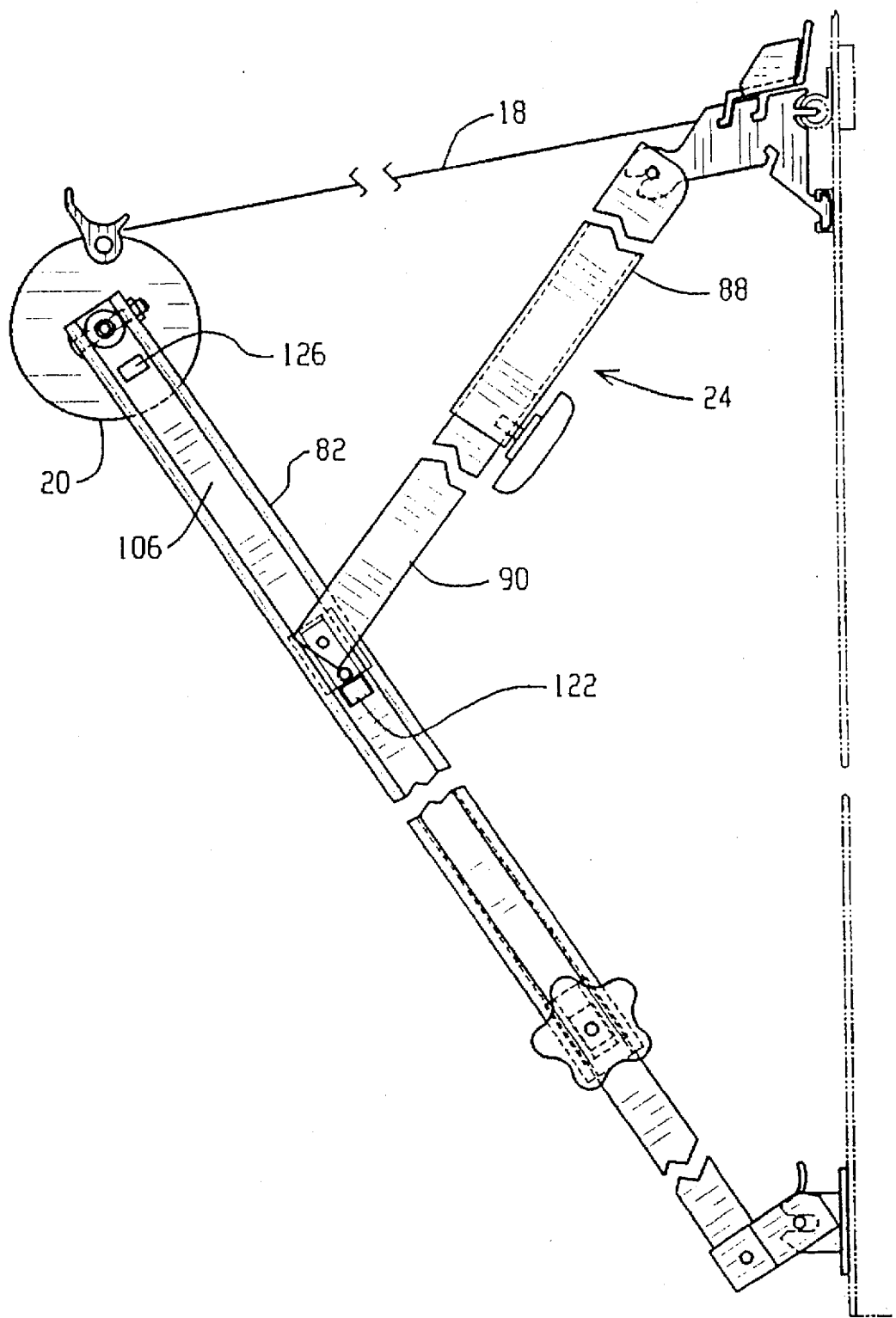
FIG. 19 is an end view of the awning assembly is a partially retracted position.

As shown in FIGS. 17 and 17A, a slider stop 118 is mounted on the post 110 between the slider 108 and the upper arm 82. The slider stop 118 has a detent 120 projecting from an inner face of the stop toward the upper arm 82. An exposed end of the stop 118 defines a lever 122 projecting from behind the slider 108 to a manually accessible location. The detent 120 is biased toward the upper arm 82 by a compression spring 124, for example. As shown in FIGS. 17 and 19, a slot 126 adapted to receive the detent 120 is located near the top of the slide channel 106 of the upper arm 82. The slot 126 is positioned such that the detent 120 is biased into the slot and locks the rafter 24 in the position shown in FIG. 18 when the slider abuts the support arm cap 116. The rafter 24 is releasable by actuating the lever 122 to remove the detent 120 from the slot 126.

Figure 20:
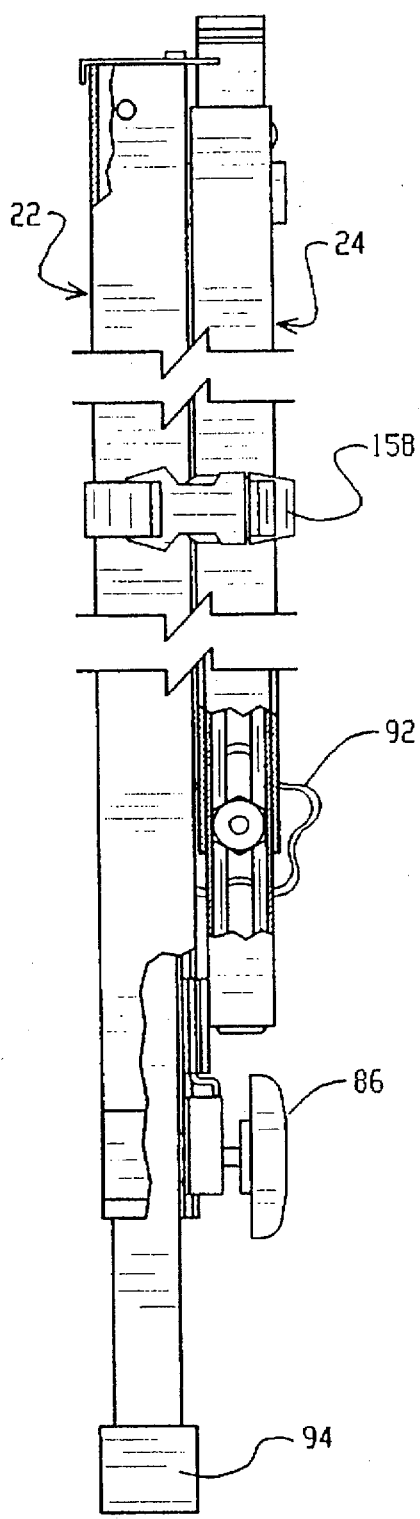
FIG. 20 is a front elevational view of a support arm and a rafter arm in a retracted position.
Figure 21:
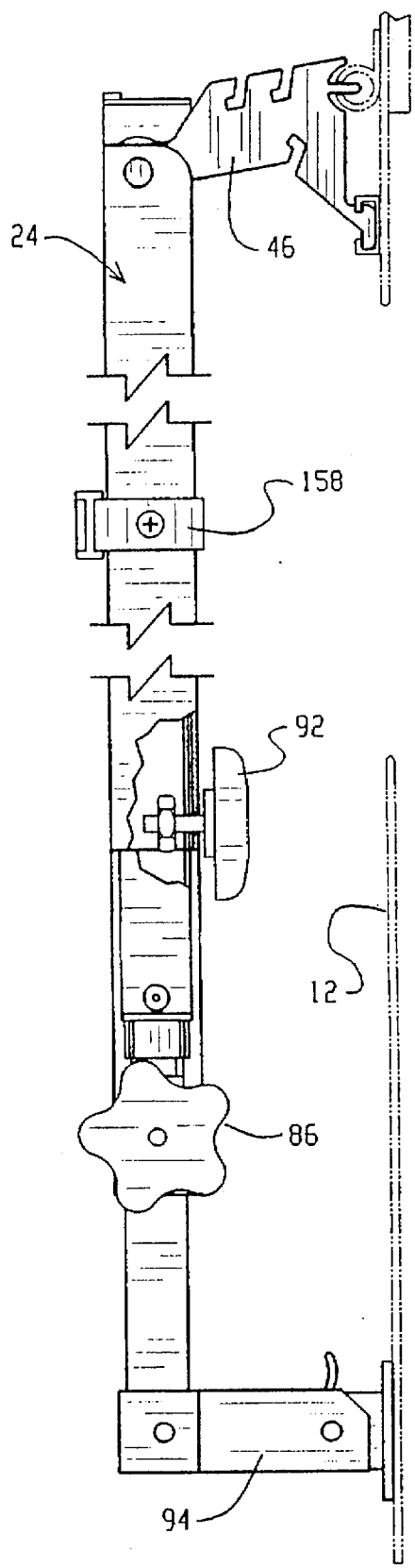
FIG. 21 is an end view of the support arm and rafter arm in a retracted position.

The rafter arms 24 and support arms 22 are relatively slidable and pivotable between an extended position, shown in FIG. 18, and a retracted position, shown in FIGS. 20 and 21. The rafter and support arm assemblies at opposite ends of the roller 20 are mirror images of each other.

Figure 22:
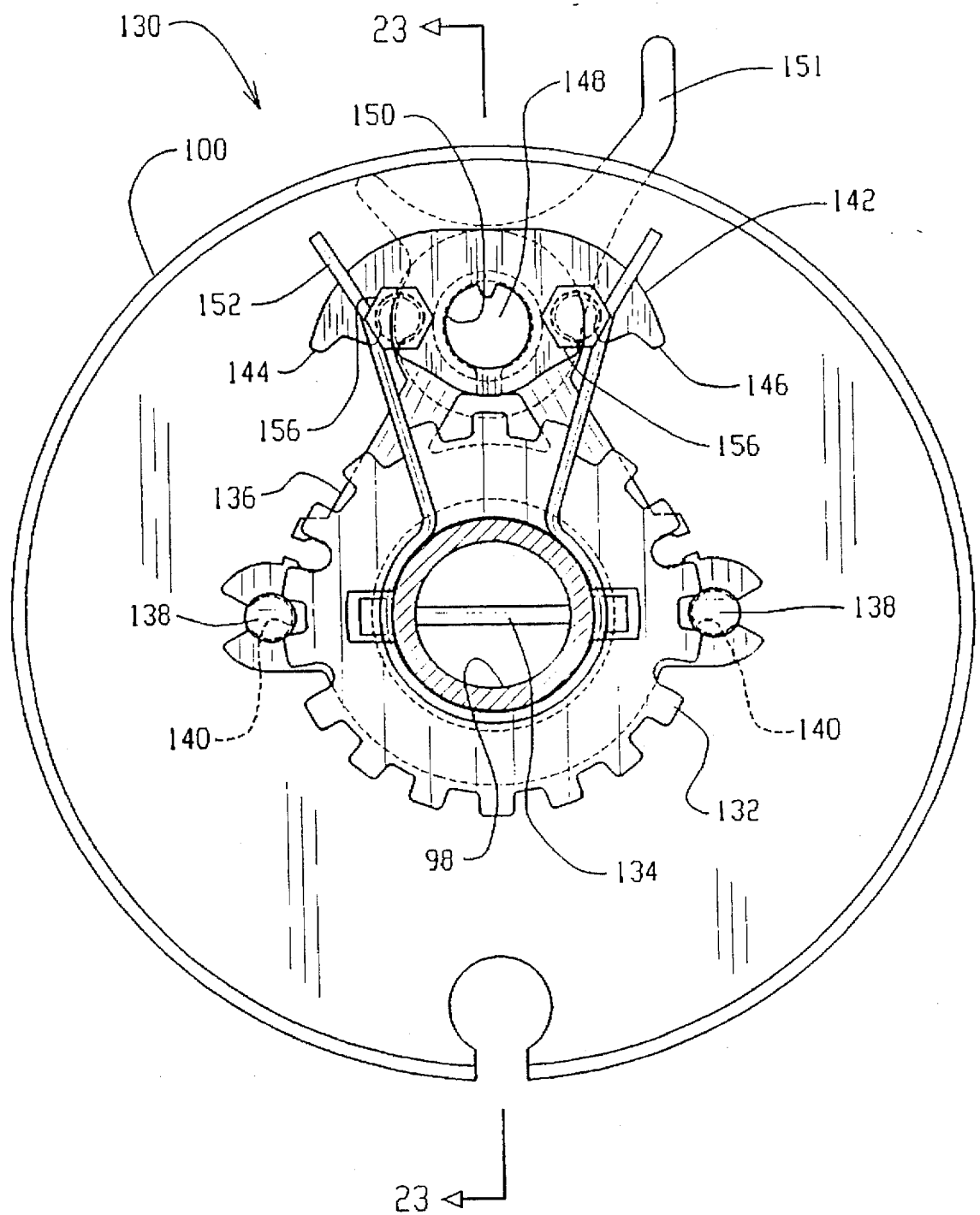
FIG. 22 shows an inside face of an end cap of the roller tube and roller lock components mounted therewith.
Figure 23:
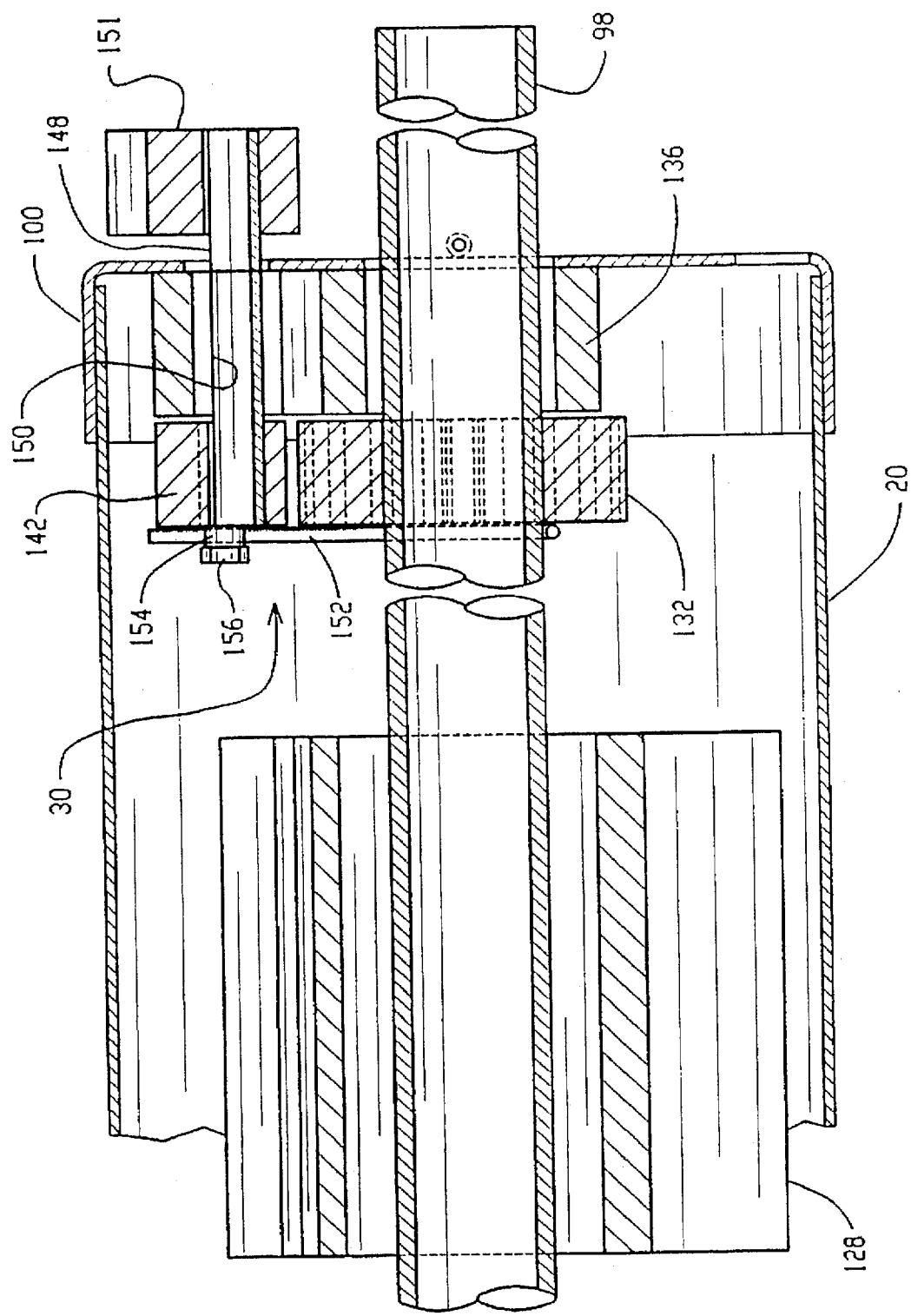
FIG. 23 is a front section of the end cap and a torsion rod taken from line 23—23 of FIG. 22.

Referring to FIGS. 22 and 23, idler bearings 128 are rotatably mounted on the torsion rod 98 and support the roller 20 for rotation about the rod. A coiled torsion spring (not shown) is connected between the torsion rod and the idler bearing to bias the roller toward a retracted position with the awning rolled thereon. The end caps 100 close the ends of the roller. One of the end caps 100 is provided with a roller lock assembly 130. As shown and described below, the lock assembly is located in the right hand end cap 100, as viewed in FIG. 1. A gear 132 having a plurality of teeth defining stops is mounted on the torsion rod 98. A pin 134 extending through the rod 98 prevents relative rotation of the rod and gear 132.

A truss 136 is rotatably mounted on the torsion rod 98 adjacent the gear 132. The end cap 100 is fastened to the truss 136 by a pair of screws 138 threaded into apertures 140 of the truss 136. A lock 142 having a first pawl 144 and an opposed second pawl 146 is pivotably mounted on the truss 136 by a post 148 extending through a passage 150 through the truss and the end cap 100. The lock 142 is operable by a handle 151 disposed on an end of the post 148 outside the end cap 100. Opposed elements of a torsion spring 152 or leaf springs bear against bushings 154 mounted on the lock 142. The bushings 154 are symmetrically on opposite sides of the post 148 by a pair of shoulder screws 156. The elements of the spring 152 bear inwardly against the bushings 154 to resist any tendency of the lock to remain in the neutral position shown in FIG. 22.

Figure 24:
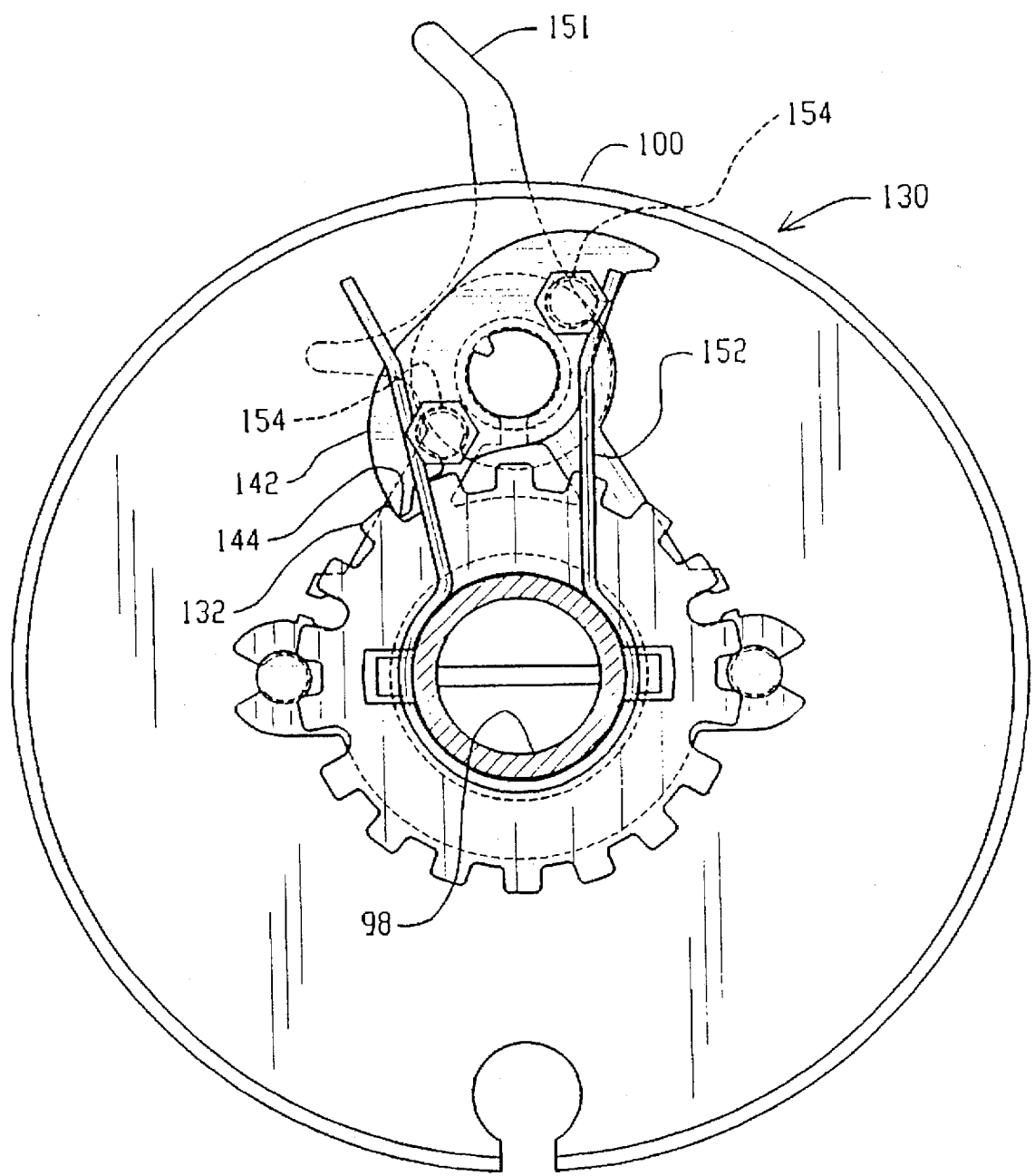
FIG. 24 shows the roller lock in a "roll up" position.

Referring to FIG. 24, by operation of the handle 151, the lock is movable to a "roll up" position wherein the roller and end cap 100 are rotatable clockwise about the torsion rod 98. In this position, the first pawl 144 engages a tooth of the gear 132 to prevent counter-clockwise rotation of the roller and end cap about the torsion rod. The opposed elements of the spring 152 bear inwardly against the bushings 154 of the lock 142 to keep the lock in position.

Figure 25:
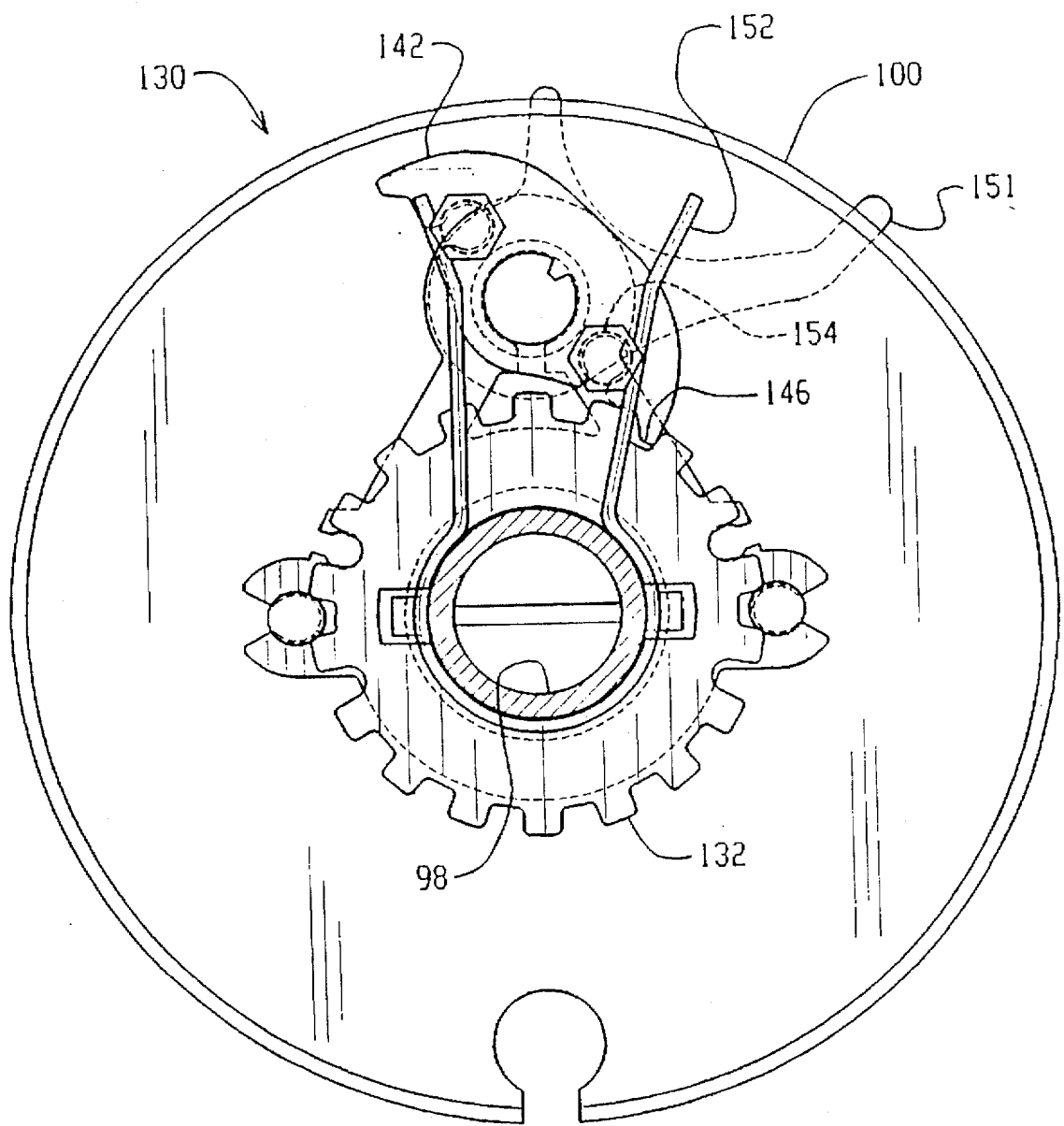
FIG. 25 shows the roller lock in a "roll down" position.

Referring to FIG. 25, by operation of the handle 151, the lock is also movable to a "roll down" position wherein the roller and end cap 100 are rotatable counter-clockwise about the torsion rod 98. In this position, the second pawl 146 engages a tooth of the gear 132 to prevent clockwise rotation of the roller and end cap about the torsion rod. The opposed elements of the spring 152 bear inwardly against the bushings 154 of the lock 142 to keep the lock in position.

In operation, the support arms 22 and rafter arms 24 are normally stowed as shown in FIGS. 20 and 21. The arms 22, 24 are spaced from the vehicle wall 12 by the feet 94 and pivot support 46 so that the arms are generally parallel. A releasable strap and buckle assembly 158 holds the arms in the parallel, stowed position. To extend the awning, the strap and buckle 158 are released, the rafter knob 92 is loosened, and the lock assembly 130 is moved to the roll down position shown in FIG. 25. As shown in FIG. 19, the roller 20 is pulled away from the vehicle and the awning unrolls therefrom. Each outboard arm 90 slides out from its inboard arm 88 to extend the rafters 24. When the awning 18 is fully extended, the rafter arms 24 are slid to the tops of the support arms 22 until the slider stop 118 engages in the slot 126, as shown in FIG. 18. The awning is pulled to a desired tension and the rafter knobs 92 are screwed in to lock the rafters 24. The supports arms 22 are extended to a desired length and locked with the support arm knobs 86. As shown in FIG. 1, the support arms 22 can remain locked in the foot brackets 96 or the feet 94 can rest on the ground. Referring to FIGS. 1 and 18, because the outboard pivot axis of the rafter 24 and support arm 22 defined by the post 110 is coaxial with the support axis of the roller 20, pivoting the support arms 22 between the wall 12 and the ground does not substantially change the tension of the awning 18.

To retract the awning, the feet 94 are replaced in the foot brackets 96 and the support arms 22 are shortened. The rafter knob 92 is loosened and the slider stop is released by lifting the lever 122, shown in FIGS. 17 and 18. The outboard end of the rafters 24 are slid down to the support arm knobs 86. The lock assembly 130 is moved to the roll up position shown in FIG. 24 by operation of the handle 151. The awning 18 is then rolled on the roller 20 as the roller is moved toward the vehicle wall. The arms 22, 24 are returned to the positions shown in FIGS. 21 and 22, the knobs 92 and 86 are tightened, and the strap and buckle assemblies 158 are used to secure the arms in the parallel, stowed position.

The present disclosure describes several embodiments of the invention, however, the invention is not limited to these embodiments. Other variations are contemplated to be within the spirit and scope of the invention and appended claims.

What is claimed is:

1. A lock assembly for an awning roller comprising:
   a roller adapted for having an awing rolled thereon;
   a rod defining a longitudinal axis of rotation of the roller;
   a stop rigidly mounted to the rod:
   a lock mounted to the roller and having a pawl adapted for engaging the stop so as to prevent relative rotation of the roller and rod in at least one direction;

a post disposed on the lock and spaced from a pivot axis of the lock; and a leaf spring having a leg engaging the post for biasing the lock towards engagement with the stop.

2. A lock assembly according to claim 1, wherein the roller rotates relative to the rod and the stop is stationary relative to the rod.

3. A lock assembly according to claim 1, wherein the lock is movable.

4. A lock assembly according to claim 1, further comprising an end cap on an end of the roller, the locking being pivotably and nonslidably mounted on the end cap.

5. A lock assembly according to claim 4, further comprising a handle on the lock adapted for pivoting the lock.

6. A lock assembly according to claim 1, wherein the stop is a gear.

7. A lock assembly for an awing roller comprising:

a roller adapted for having an awning rolled thereon;

a rod defining a longitudinal axis of rotation of the roller;

a stop rigidly mounted to the rod;

a lock having first and second pawls adapted for engaging the stop so as to prevent relative rotation of the roller and rod in only a first direction when engaged with the stop and the second pawl prevents relative rotation of the roller and rod in only a second direction;

two posts disposed on the lock symmetrically about a pivot axis of the lock; and a spring having legs engaging the posts for biasing the lock toward engagement with the stop.

8. A lock assembly according to claim 7, wherein the lock is mounted to the roller.

9. A lock assembly according to claim 7, wherein the spring is coiled around the rod.

10. A lock assembly according to claim 9, wherein the spring legs create a force directed generally toward the pivot axis.

* * * * *